US012761234B2

(12) United States Patent
Rousseau et al.

(10) Patent No.: US 12,761,234 B2
(45) Date of Patent: Oct. 13, 2026

(54) SYSTEM FOR TREATING BIOLOGICAL SAMPLES, COMPRISING A SYSTEM FOR CONVEYING HOLDERS FOR BIOLOGICAL SAMPLE CONTAINERS

(71) Applicant: ARTEION, Paris (FR)

(72) Inventors: Alain Rousseau, Paris (FR); Laurent Croisé, Angers (FR)

(73) Assignee: ARTEION, Paris (FR)

( * ) Notice: Subject to any disclaimer, the term of this patent is extended or adjusted under 35 U.S.C. 154(b) by 525 days.

(21) Appl. No.: 18/287,759

(22) PCT Filed: Apr. 21, 2022

(86) PCT No.: PCT/FR2022/050761
§ 371 (c)(1),
(2) Date: Oct. 20, 2023

(87) PCT Pub. No.: WO2022/223932
PCT Pub. Date: Oct. 27, 2022

(65) Prior Publication Data

US 2024/0183873 A1 Jun. 6, 2024

(30) Foreign Application Priority Data

Apr. 22, 2021 (FR) ..................................... 21/04223

(51) Int. Cl.
*G01N 35/04* (2006.01)

(52) U.S. Cl.
CPC ..... *G01N 35/04* (2013.01); *G01N 2035/0415* (2013.01); *G01N 2035/0465* (2013.01); *G01N 2035/0489* (2013.01)

(58) Field of Classification Search
CPC ... G01N 2035/0415; G01N 2035/0465; G01N 2035/0489; G01N 35/04
See application file for complete search history.

(56) References Cited

U.S. PATENT DOCUMENTS

2022/0113326 A1 4/2022 Rousseau

FOREIGN PATENT DOCUMENTS

EP 2333558 B1 6/1982
FR 3047082 B1 6/1982
(Continued)

OTHER PUBLICATIONS

Matsumoto JP2001-278409 English Translation (Year: 2026).*
(Continued)

*Primary Examiner* — Jennifer Wecker
*Assistant Examiner* — Jonathan Bortoli
(74) *Attorney, Agent, or Firm* — CANTOR COLBURN LLP

(57) ABSTRACT

A conveyor system including a conveyor unit including a carriage guide element defining a conveyor track, and a self-propelled conveyor carriage movable along the conveyor track and configured to move a container holder along a travel path; and a plurality of receiving locations arranged along the travel path. The self-propelled conveyor carriage includes two gripping arms mounted movable between a gripping position in which the gripping arms are configured to grip and lift a container holder arranged in one of the receiving locations, and a release position in which the gripping arms are configured to release the container holder and deposit the container holder in one of the receiving locations.

12 Claims, 8 Drawing Sheets

(56) References Cited

FOREIGN PATENT DOCUMENTS

| | | | | |
|---|---|---|---|---|
| JP | 2001174468 | A | | 6/1982 |
| JP | S5794858 | A | | 6/1982 |
| JP | 2001278409 | A | * | 10/2001 |

OTHER PUBLICATIONS

International Search Report dated Sep. 12, 2022; International Application No. PCT/FR2022/050761; 3 pages (English).
International Search Report dated Sep. 12, 2022; International Application No. PCT/FR2022/050761; 5 pages (non-English).
Written Opinion dated Sep. 12, 2022; International Application No. PCT/FR2022/050761; 9 pages (non-English).

* cited by examiner

SYSTEM FOR TREATING BIOLOGICAL SAMPLES, COMPRISING A SYSTEM FOR CONVEYING HOLDERS FOR BIOLOGICAL SAMPLE CONTAINERS

CROSS REFERENCE TO RELATED APPLICATIONS

This application is a National Stage of PCT Application No. PCT/FR2022/050761 filed on Apr. 21, 2022, which claims priority to French Patent Application No. 21/04223 filed on Apr. 22, 2021, the contents each of which are incorporated herein by reference thereto.

TECHNICAL FIELD

The present disclosure relates to a system for treating biological samples comprising a conveyor system configured to convey container holders intended to support containers containing biological samples, such as biological liquid samples.

BACKGROUND

In a known manner, such a conveyor system comprises:

a plurality of container holders intended to support containers containing biological samples to be analyzed, a conveyor unit configured to convey the container holders, the conveyor unit including in particular:

a holder guide element defining a guide track, the holder guide element being configured to receive a container holder and to guide said container holder in translation along the guide track, a carriage guide element defining a conveyor track extending along the support guide element, a self-propelled conveyor carriage movable along the conveyor track, the carriage guide element being configured to guide the self-propelled conveyor carriage during displacements of the self-propelled conveyor carriage along the conveyor track, the self-propelled conveyor carriage being configured to move a container holder in translation in the holder guide element and along the guide track when the self-propelled conveyor carriage moves along the conveyor track, and a plurality of receiving locations arranged along the guide track, each of the receiving locations being configured to receive and at least temporarily store a container holder, the self-propelled conveyor carriage being further configured to move a container holder transversely to the guide track so as to move said container holder in or out of a receiving location.

Such a conveyor system considerably limits the tedious manipulations for an operator and ensures a high conveying capacity and a high analysis rate, in particular when a container holder has to be conveyed between different analysis and/or measurement devices.

In addition, in the event of failure of the self-propelled conveyor carriage, all it needs is to replace the latter by another self-propelled conveyor carriage, which ensures a short shutdown duration of the conveyor system, and therefore considerably limits the unavailability, for the analysis laboratory, of a biological analysis system equipped with such a conveyor system. It is also possible to equip the conveyor unit with two self-propelled conveyor carriages, such that one of the self-propelled conveyor carriages could ensure a permanent service when reloading the other self-propelled conveyor carriage or during maintenance thereof.

Furthermore, the presence of two self-propelled conveyor carriages ensures an increased conveying rate.

Furthermore, since the conveyor carriage is self-propelled, the conveyor track may be essentially “passive”, and therefore be defined by a simple carriage guide element, such as a guide rail, which considerably simplifies the conveyor system and increases the reliability of such a system, by reducing costs and enables a more easily configurable, quicker and easier installation.

However, when a container holder is driven in translation by the self-propelled conveyor carriage, the frictions of the container holder on the holder guide element generates noise which may be a source of discomfort for the operators. In addition, these frictions increase the electrical consumption of the self-propelled conveyor carriage and therefore affect the autonomy of the battery of the self-propelled conveyor carriage.

Furthermore, when a container holder is transferred by the self-propelled conveyor carriage from the guide track to a receiving location (and therefore moved perpendicularly to the conveying direction of the self-propelled conveyor carriage), the container holder could tilt vertically, because of the frictions of the lower surface of the container holder on the holder guide element, which could induce a non-optimum positioning of the container holder in the receiving location and therefore affect gripping of the container holder by a loading mechanism associated with the receiving location.

BRIEF SUMMARY

The present disclosure aims to overcome these drawbacks.

Hence, the technical problem at the origin of the present disclosure consists in providing a system for treating biological samples comprising a conveyor system which has a simple, economical and reliable structure, while ensuring a high conveying capacity, an optimized analysis rate and a simple and quick maintainability.

To this end, the present disclosure relates to a biological sample treatment system, such as a biological analysis system, comprising:

a conveyor system comprising:

a plurality of container holders intended to hold containers containing biological samples, such as biological liquid samples, a conveyor unit configured to convey the container holders, the conveyor unit including a carriage guide element defining a conveyor track, and a self-propelled conveyor carriage movable along the conveyor track, the carriage guide element being configured to guide the self-propelled conveyor carriage) during displacements of the self-propelled conveyor carriage along the conveyor track, the self-propelled conveyor carriage including a carriage body and being configured to move a container holder along a travel path when the self-propelled conveyor carriage moves along the conveyor track, and a plurality of receiving locations arranged along the travel path and laterally offset with respect to the travel path, each of the receiving locations being configured to receive and at least temporarily store a container holder, the self-propelled conveyor carriage being further configured to move a container holder transversely to the travel path so as to move said container holder into or out of a receiving location, at least one analysis and/or measurement device arranged along the conveyor unit and configured to carry out blood tests, characterized in that the self-propelled conveyor carriage includes two gripping arms spaced apart from each other and mounted movable between at least a gripping position in which the gripping arms are brought closer to each other and are configured to grip and lift a container holder arranged in one of the receiving locations, and a release position in which the gripping arms are moved away from each other and are configured to release the container holder and deposit the container holder in one of the receiving locations, the self-propelled conveyor carriage being configured to move a container holder, gripped and lifted by the gripping arms, along the travel path when the self-propelled conveyor carriage moves along the conveyor track, and in that each of the gripping arms includes a lifting member, the lifting members being configured to be received respectively in two receiving recesses provided on two transverse faces of a container holder which are opposite to each other and to lift said container holder when the gripping arms are moved to the gripping position.

Such a configuration of the conveyor system, and in particular of the self-propelled conveyor carriage, allows moving a container holder at a distance from the carriage guide element and therefore avoid any friction between the container holder and the carriage guide element during the displacements of the container holder along the travel path and also during the displacements of the container holder transversely to the travel path (for example when loading the container holder in a receiving location).

This results in a better autonomy of the battery of the self-propelled conveyor carriage and therefore of the electrical charging cycles of the battery which are more spaced over time. Thus, the shutdown periods of the self-propelled conveyor carriage are considerably reduced.

Furthermore, the absence of friction between a container holder and the carriage guide element during the displacements of said container holder along the travel path substantially reduces the noise generated by the conveyor system, and considerably improves the comfort of an operator.

In addition, the absence of friction between a container holder and the carriage guide element during the displacements of said container holder transversely to the travel path (in particular when loading the container holder in a receiving location) ensures an optimum positioning of said container holder in a receiving location, and consequently an optimum gripping of said container holder by a loading mechanism associated with the receiving location.

Thus, the conveyor system of the biological sample treatment system according to the present disclosure has an increased reliability compared to the conveyor systems of the prior art, while ensuring a further improved conveying capacity and analysis rate.

The biological sample treatment system may further have one or more of the following features, considered separately or in combination.

According to an embodiment of the present disclosure, the travel path extends alongside the conveyor track.

According to an embodiment of the present disclosure, the two gripping arms are configured to clamp between them a container holder when they occupy the gripping position.

According to an embodiment of the present disclosure, the two gripping arms project from a lateral face of the carriage body when the two gripping arms occupy the gripping position.

According to an embodiment of the present disclosure, the self-propelled conveyor carriage is configured such that, when a container holder is conveyed by the self-propelled conveyor carriage along the travel path, said container holder extends opposite a lateral face of the carriage body, and more particularly of the lateral face from which the two gripping arms project when they occupy the gripping position.

According to an embodiment of the present disclosure, each of the gripping arms is pivotally mounted about a respective pivot axis which is substantially vertical.

According to an embodiment of the present disclosure, the gripping arms are movable in a travel plane which is substantially horizontal.

According to an embodiment of the present disclosure, each of the gripping arms includes a gripping portion configured to exert a bearing force against a respective transverse face of a container holder when the gripping arms are in the gripping position.

According to an embodiment of the present disclosure, each gripping portion is located at a free end of the respective gripping arm.

According to an embodiment of the present disclosure, each receiving recess is provided in an upper portion of the respective transverse face.

According to an embodiment of the present disclosure, each gripping portion includes a bearing surface configured to exert a bearing force against a respective transverse face of a container holder when the gripping arms are in the gripping position, each lifting member extending from the bearing surface of a respective 20 gripping portion.

According to an embodiment of the present disclosure, each of the lifting members includes a lifting ramp which is inclined with respect to the vertical, the two lifting ramps being configured to lift a container holder when the gripping arms are moved into the gripping position.

According to an embodiment of the present disclosure, the conveyor system comprises at least one receiving area arranged along the travel path and including a first receiving location and a second receiving location which are offset from each other along the travel path and each of which is configured to receive and at least temporarily store a container holder.

According to an embodiment of the present disclosure, the at least one receiving area includes a first guide wall and a second guide wall offset with respect to each other according to a direction that extends transversely to the travel path, the first and second guide walls defining a guide track extending along the travel path and the first and second receiving locations being arranged respectively at opposite ends of the guide track, the first guide wall, which separates the travel path and the guide track, including a passage opening which is located opposite the second guide wall and which is intended for the passage of a container holder, the self-propelled conveyor carriage being configured to move a container holder, gripped and lifted by the gripping arms, through the passage opening and along the guide track.

According to an embodiment of the present disclosure, the first and second guide walls extend respectively in a first extension plane and in a second extension plane which are substantially vertical and parallel to the travel path.

According to an embodiment of the present disclosure, the first and second guide walls are configured to guide a container holder in translation along the guide track.

According to an embodiment of the present disclosure, the self-propelled conveyor carriage includes a support element on which the gripping arms are movably mounted, the support element being mounted so as to be able to move in translation relative to the carriage body in a travel direction which is transverse to the conveyor track and between at least a conveying position in which the conveyor carriage is configured to move a container holder, gripped and lifted by the gripping arms, along the travel path and a transfer position in which the self-propelled conveyor carriage is configured to grip and lift a container holder arranged in a receiving location or to release and deposit a container holder in a receiving location.

According to an embodiment of the present disclosure, when the support element occupies the conveying position and the gripping arms occupy the gripping position, each of the gripping arms projects from the lateral face of the carriage body by a first distance, and, when the support element occupies the transfer position and the gripping arms occupy the gripping position, each of the gripping arms projects from the lateral face of the carriage body by a second distance which is larger than the first distance.

According to an embodiment of the present disclosure, the carriage guide element includes two guide rails configured to cooperate with a lower surface of the self-propelled conveyor carriage during the displacements of the self-propelled conveyor carriage along the conveyor track.

According to an embodiment of the present disclosure, the conveyor system comprises a storage device arranged along the travel path and configured to store container holders, at least one of the receiving locations being arranged proximate to the storage device.

According to an embodiment of the present disclosure, the storage device comprises an actuating mechanism configured to move a container holder, stored in the storage device, in the at least one receiving location located proximate to the storage device.

According to an embodiment of the present disclosure, the conveyor system includes a control unit configured to communicate remotely with the self-propelled conveyor carriage. The control unit may be a computer, for example a PC type computer.

According to an embodiment of the present disclosure, the control unit is configured to communicate wirelessly, for example by wifi or Bluetooth, with the self-propelled conveyor carriage.

According to an embodiment of the present disclosure, the two gripping arms of the self-propelled conveyor carriage are configured to occupy a first gripping position in which the two gripping arms project from a first lateral face of the carriage body and are configured to grip and lift a container holder arranged on a first side of the conveyor track, and a second gripping position in which the two gripping arms project from a second lateral face of the carriage body and are configured to grip and lift a container holder arranged on a second side of the conveyor track.

According to an embodiment of the present disclosure, the self-propelled conveyor carriage comprises at least one drive wheel configured to roll on the carriage guide element, and at least one rotational drive mechanism configured to drive the at least one drive wheel in rotation.

According to an embodiment of the present disclosure, the self-propelled conveyor carriage includes a first pair of drive wheels which are located proximate to a first longitudinal end of the carriage body, and a second pair of drive wheels which are located proximate to a second longitudinal end of the carriage body. According to a variant of the present disclosure, the self-propelled conveyor carriage could include only two drive wheels arranged respectively proximate to the first and second longitudinal ends of the carriage body.

According to an embodiment of the present disclosure, the self-propelled conveyor carriage is movable along the conveyor track in a first travel direction and in a second travel direction opposite to the first travel direction.

According to an embodiment of the present disclosure, the conveyor track is substantially rectilinear. Nonetheless, according to a variant of the present disclosure, the conveyor track could be formed by a plurality of rectilinear segments arranged such that two successive rectilinear segments are arranged at 90° with respect to each other, and the conveyor unit could include a plurality of self-propelled conveyor carriages each configured to move along a respective rectilinear segment, the passage of a container holder from one rectilinear segment to another rectilinear segment being done by a transfer rotor having a substantially vertical axis of rotation and including a plurality of storage compartments each configured to receive a container holder.

According to an embodiment of the present disclosure, the self-propelled conveyor carriage is configured to move a container holder along the travel path according to a travel direction that is substantially parallel to a direction of extension of the container holder.

According to an embodiment of the present disclosure, the self-propelled conveyor carriage is configured to keep the container holder substantially vertical during displacements thereof along the conveyor track.

According to an embodiment of the present disclosure, when the two gripping arms occupy the gripping position, the two gripping arms are spaced apart by a distance corresponding substantially to the length of a container holder.

According to an embodiment of the present disclosure, the two gripping arms are configured to cooperate respectively with opposite lateral walls of a container holder.

According to an embodiment of the present disclosure, the self-propelled conveyor carriage includes an actuating device configured to move the two gripping arms between the gripping and release positions.

According to an embodiment of the present disclosure, the actuating device is configured to make each of the gripping arms pivot about its pivot axis. For example, the actuating device may include two motors each of which is coupled in rotation to a respective gripping arm.

According to an embodiment of the present disclosure, the conveyor system includes at least one positioning marking arranged on the conveyor track, and the self-propelled conveyor carriage includes detection means arranged to detect the at least one positioning marking, and control means arranged to control an immobilization of the self-propelled conveyor carriage when the detection means detect the at least one positioning marking. For example, the conveyor system includes at least one positioning marking arranged opposite each receiving location.

According to an embodiment of the present disclosure, the self-propelled conveyor carriage includes determination means configured to determine the position of the self-propelled conveyor carriage along the conveyor track according to the distance travelled by the self-propelled conveyor carriage.

According to an embodiment of the present disclosure, the support element and the gripping arms are configured such that, when the self-propelled conveyor carriage is arranged opposite the at least one receiving area and the gripping arms are in the gripping position, a displacement of the support element from the conveying position to the transfer position causes a displacement of the container holder from the travel path to the at least one receiving area.

According to an embodiment of the present disclosure, the support element and the gripping arms are configured such that, when the self-propelled conveyor carriage is arranged opposite the at least one receiving area and the gripping arms are in the gripping position, a displacement of the support element from the transfer position to the conveying position causes a displacement of the container holder from the receiving area to the travel path.

According to an embodiment of the present disclosure, the self-propelled conveyor carriage includes a translational drive mechanism configured to move the support element in translation relative to the carriage body.

According to an embodiment of the present disclosure, the self-propelled conveyor carriage includes a battery configured to electrically power the self-propelled conveyor carriage. Advantageously, the battery is rechargeable. For example, the battery may be recharged by contact or by induction.

According to an embodiment of the present disclosure, the conveyor system includes a recharging area including an electrical recharging device configured to electrically recharge the battery when the self-propelled conveyor carriage is located in the recharging area. For example, the recharging area is located at an end of the conveyor track.

According to an embodiment of the present disclosure, the at least one analysis and/or measurement device includes a loading module configured to load, in the at least one analysis and/or measurement device, a container holder deposited by the self-propelled conveyor carriage in the first receiving location of a receiving area associated with the at least one analysis and/or measurement device, and an unloading module configured to move a container holder, loaded beforehand in the at least one analysis and/or measurement device, in the second receiving location of said receiving area.

According to an embodiment of the present disclosure, the at least one analysis and/or measurement device includes at least one module among a spectrophotometric reading module, a fluorescence reading module, a luminescence reading module, a coagulation measurement module and a cytometry module.

According to an embodiment of the present disclosure, the at least one analysis and/or measurement device includes a holder stirring device, the loading module of the at least one transfer device being configured to transfer a container holder from the first receiving location to the stirring device.

BRIEF DESCRIPTION OF THE DRAWINGS

Anyway, the present disclosure will be well understood from the following description with reference to the appended schematic drawing representing, as a non-limiting example, an embodiment of this biological sample treatment system.

DETAILED DESCRIPTION

In the present document, the terms "horizontal" and "vertical" are used to describe the self-propelled conveyor carriage with reference to the self-propelled conveyor carriage in the situation of use when it rests by its drive wheels on a flat and horizontal surface.

Figure 1:
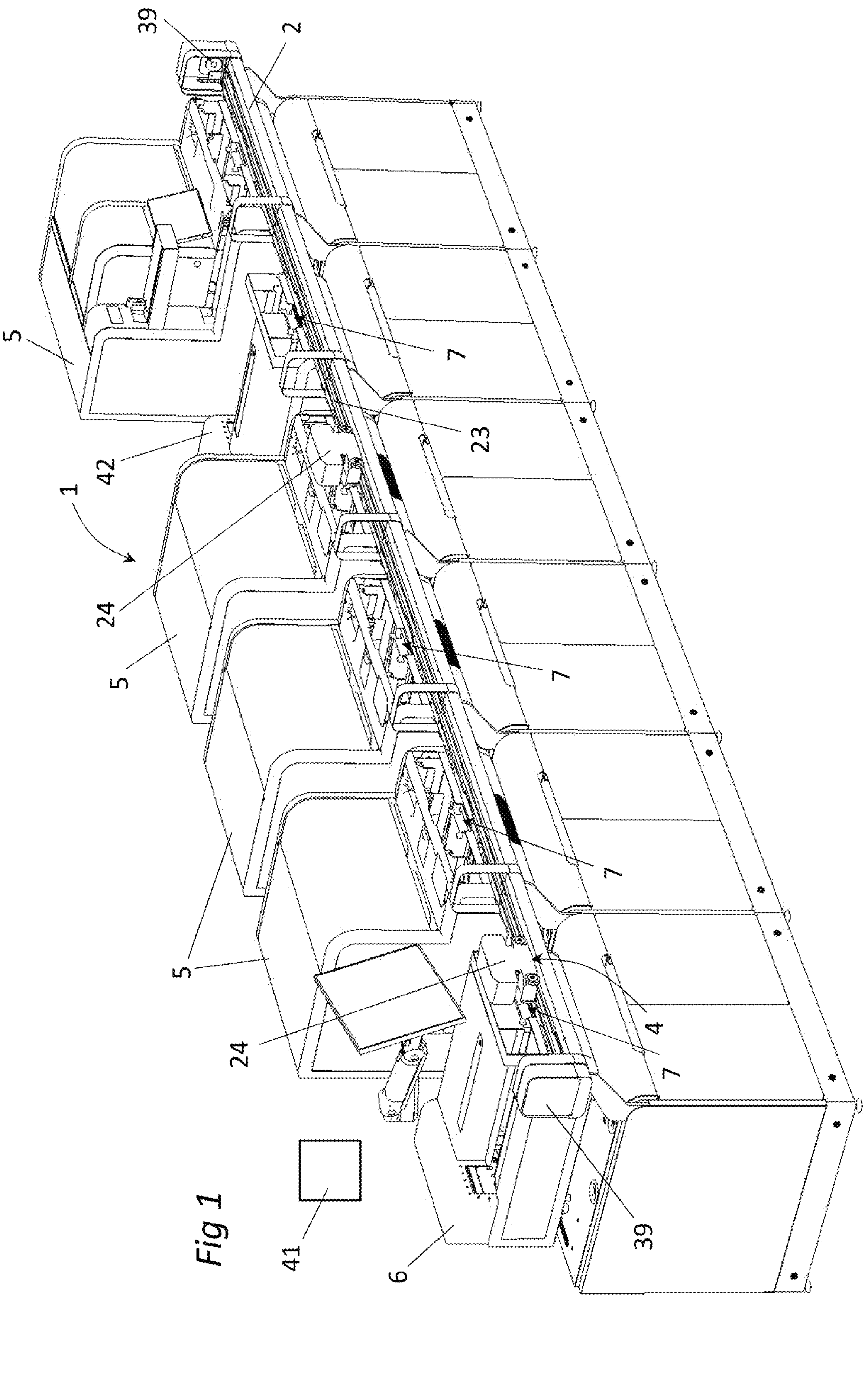
FIG. 1 is a perspective view of a biological analysis system for in vitro diagnosis according to the present disclosure.

FIG. 1 shows a biological analysis system 1, and more particularly an automated biological analysis system, for in vitro diagnosis comprising a conveyor system 2 which includes a plurality of container holders 3 and a conveyor unit 4 configured to convey the container holders 3. The biological analysis system 1 further includes a plurality of analysis and/or measurement devices 5 arranged along the conveyor unit 4 and configured to carry out blood tests.

For example, each analysis and/or measurement device 5 may include one or more module(s) selected in particular from among a spectrophotometric reading module, a fluorescence reading module, a luminescence reading module, a cytometry module and a coagulation measurement module.

The conveyor system 2 also comprises a storage device 6, also called loading device, arranged along the conveyor unit 4 and configured to store container holders 3.

The conveyor system 2 further comprises several receiving areas 7 which are arranged along the conveyor unit 4 and each of which includes at least one receiving location 8 which is configured to receive and store at least temporarily a container holder 3.

Advantageously, a receiving area 7 is located proximate to the storage device 6, and a receiving area 7 is located proximate to each of the analysis and/or measurement devices 5.

According to the embodiment shown in the figures, each of the receiving areas 7 (cf. FIGS. 1 and 11 to 16) includes two receiving locations 8, namely a first receiving location 8.1 and a second receiving location 8.2 which are offset with respect to each other along the conveyor unit 4. Advantageously, each analysis and/or measurement device 5 includes a loading module (not shown in the figures) configured to load, in said analysis and/or measurement device 5, a container holder 3 arranged in the first receiving location 8.1 of the respective receiving area 7, and an unloading module (not shown in the figures) configured to move a container holder 3, loaded beforehand in said analysis and/or measurement device 5, in the second receiving location 8.2 of the respective receiving area 7. Similarly, the storage device 6 comprises an actuating mechanism (not shown in the figures) configured to move a container holder 3, stored in the storage device 6, in the second receiving location 8.2 of the respective receiving area 7.

According to the embodiment shown in the figures, each receiving area 7 includes a first guide wall 13 and a second guide wall 14 which are offset with respect to each other and which extend substantially vertically. The first and second guide walls 13, 14 define a guide track extending along the conveyor unit 4, and are configured to guide a container holder 3 in translation along the guide track. Advantageously, the first and second receiving locations 8.1, 8.2 of said receiving area 7 are arranged respectively at opposite ends of the respective guide track, and the first guide wall 13 includes a passage opening 15 which is located opposite the respective second guide wall 14 and which is intended for the passage of a container holder 3.

Figure 10:
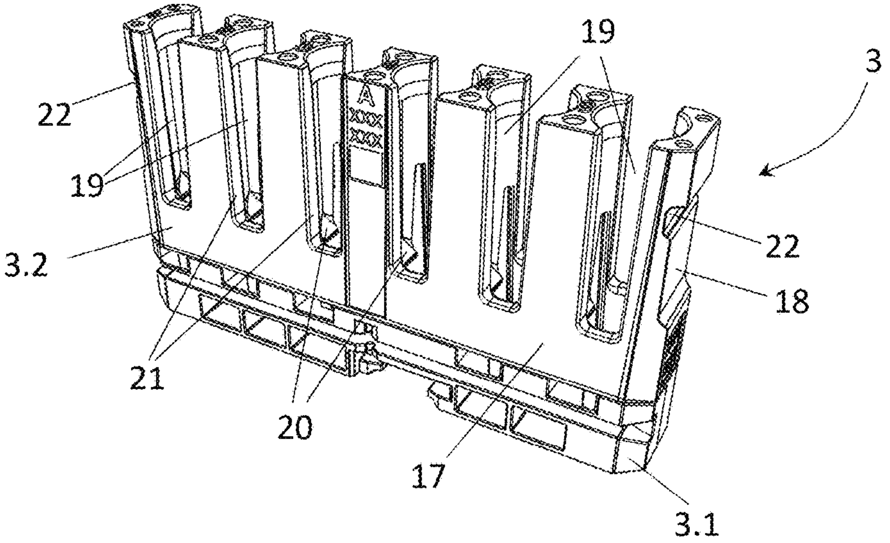
FIG. 10 is a perspective view of the container holder of FIG. 5.
Figure 11:
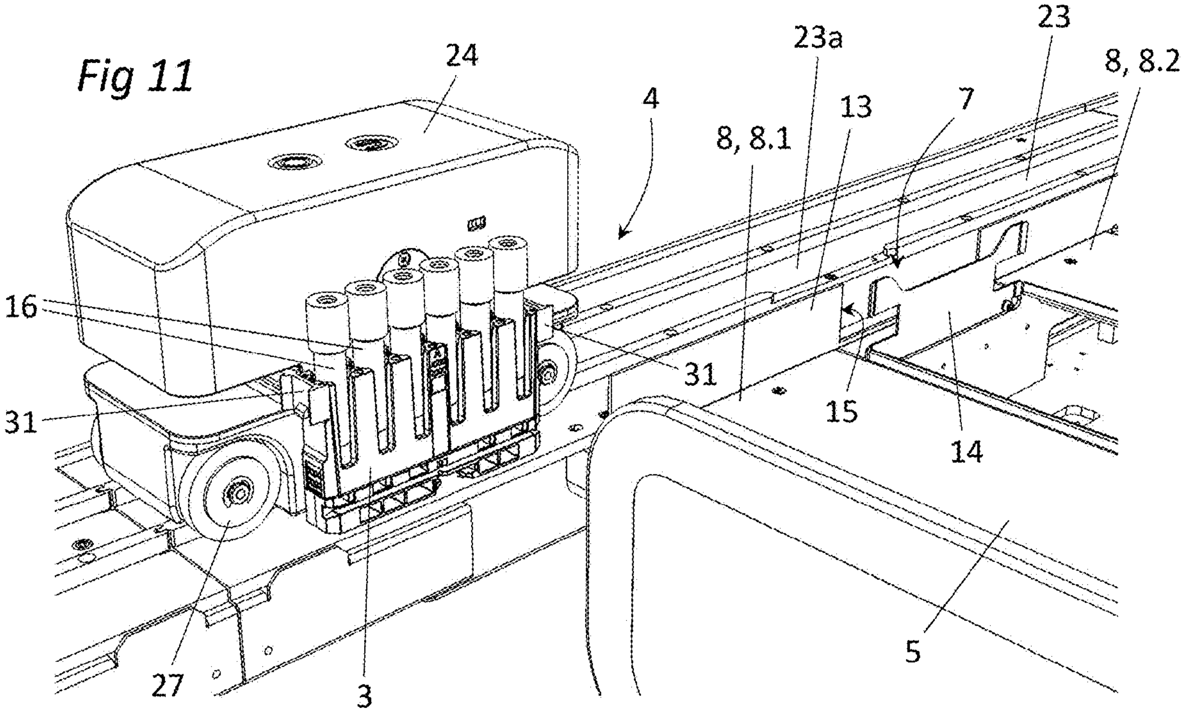
FIG. 11 is a partial perspective view of the biological analysis system of FIG. 1 showing the self-propelled conveyor carriage conveying a container holder towards a receiving area associated with an analysis and/or measurement device.

As shown more particularly in FIGS. 10 and 11, each container holder 3, also called rack, cassette or carrier, is intended to hold a plurality of containers 16 containing biological liquid samples to be analyzed, such as blood, plasma or blood serum samples. Advantageously, the containers 16 are sample tubes.

Each container holder 3 has a parallelepiped general shape, and extends according to the direction of extension. More particularly, each container holder 3 includes two longitudinal faces 17 opposite to each other, and two transverse faces 18 opposite to each other.

Each container holder 3 includes a base 3.1 and a container receiving portion 3.2. Advantageously, the container receiving portion 3.2 of each container holder 3 has a plane of symmetry extending transversely to the direction of extension of said container holder 3. Thus, a container holder 3 may be loaded indifferently in the storage device 6.

Each container holder 3 includes a plurality of receiving compartments 19, preferably cylindrical, aligned according to the direction of extension of said container holder 3. Advantageously, the receiving compartments 19 are open upwards in order to enable an easy insertion and removal of the containers 16 into and out of the receiving compartments 19. Advantageously, the lower portion of each receiving compartment 19 is equipped with retaining members 20, for example elastically deformable, configured to retain a container 16 in said receiving compartment 19. Such an arrangement of the retaining members 20 allows avoiding damage to identification codes carried by the containers 16 and for example provided on identification tags.

Each container holder 3 comprises a plurality of reading windows 21 enabling an optical reading of identification codes carried by the containers 16 received on said container holder 3. Advantageously, two reading windows 21 are associated with each receiving compartment 19 in order to enable an optical reading from each side of the container holder 3.

Each container holder 3 also comprises two receiving recesses 22 provided respectively on two transverse faces 18 of said container holder 3 and the function of which will be explained hereinafter. Advantageously, each receiving recess 22 is provided in an upper portion of the respective transverse face 18.

As shown in FIGS. 11 to 16, the conveyor unit 4 comprises a carriage guide element 23 defining a conveyor track which is rectilinear. For example, the carriage guide element 23 may include a support surface 23*a*, which is horizontal and planar, and two guide rails 23*b* fastened to support surface 23*a*. Advantageously, the conveyor track is parallel to the first and second guide walls 13, 14 belonging to each receiving area 7. According to a variant of the present disclosure, the conveyor track could, nonetheless, have a radius of curvature.

In addition, the conveyor unit 4 comprises a self-propelled conveyor carriage 24 which is movable along the conveyor track. The self-propelled conveyor carriage 24 is configured to move a container holder 3 along a travel path, which is parallel to the conveyor track, when the self-propelled conveyor carriage 24 moves along the conveyor track, and to move a container holder 3 transversely to the travel path so as to move said container holder 3 into or out of a receiving location 8 which is laterally offset with respect to the travel path. Advantageously, the self-propelled conveyor carriage 24 is configured to hold a substantially vertical container holder 3 during travel thereof along the travel path.

More particularly, the carriage guide element 23 is configured to guide the self-propelled conveyor carriage 24 during displacements thereof along the conveyor track. Advantageously, the two guide rails 23*b* are configured to cooperate with two guide grooves 25 (cf. FIG. 3) provided on a lower surface of the self-propelled conveyor carriage 24.

Figure 2:
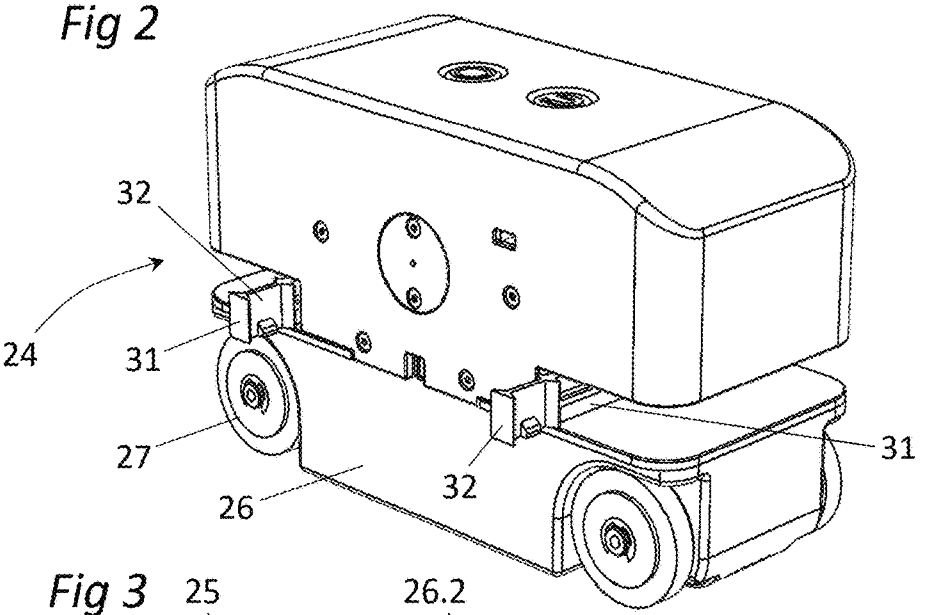
FIG. 2 is a perspective view of a self-propelled conveyor carriage belonging to the biological analysis system of FIG. 1.
Figure 3:
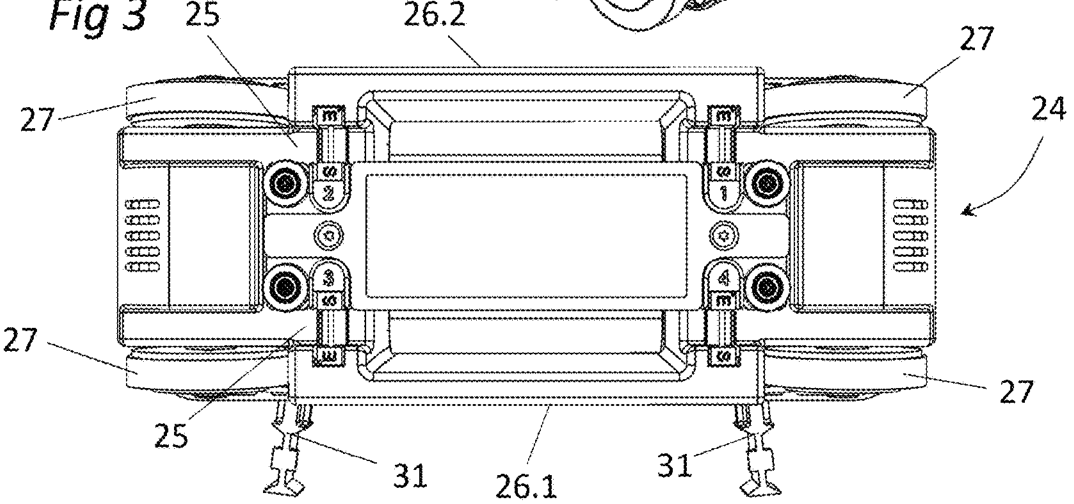
FIG. 3 is a bottom view of the self-propelled conveyor carriage of FIG. 2.
Figure 4:
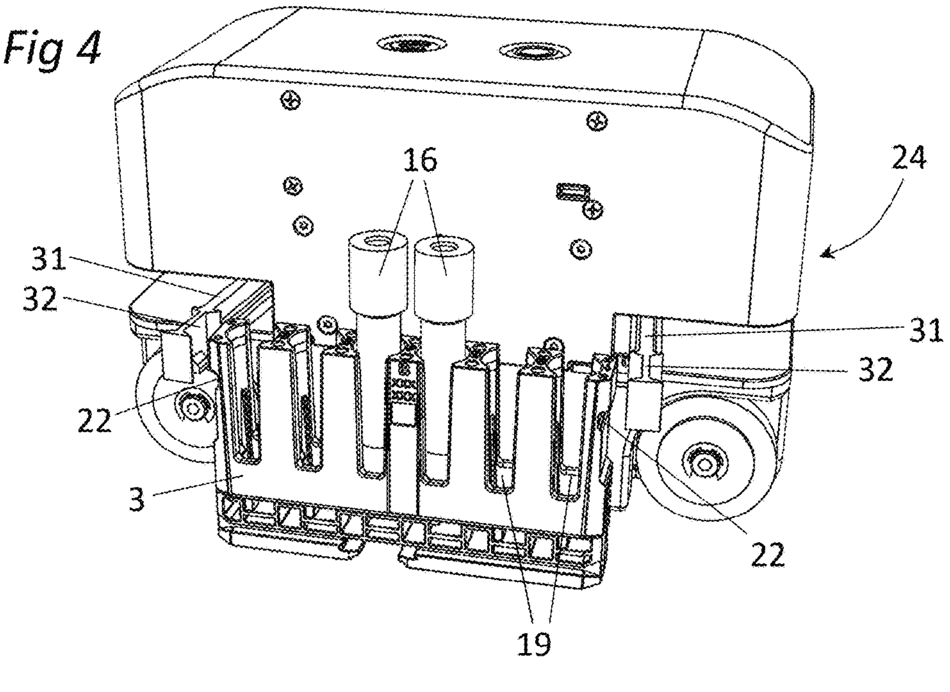
FIG. 4 is a perspective view of the self-propelled conveyor carriage of FIG. 2 during gripping of a container holder belonging to the biological analysis system of FIG. 1.
Figure 5:
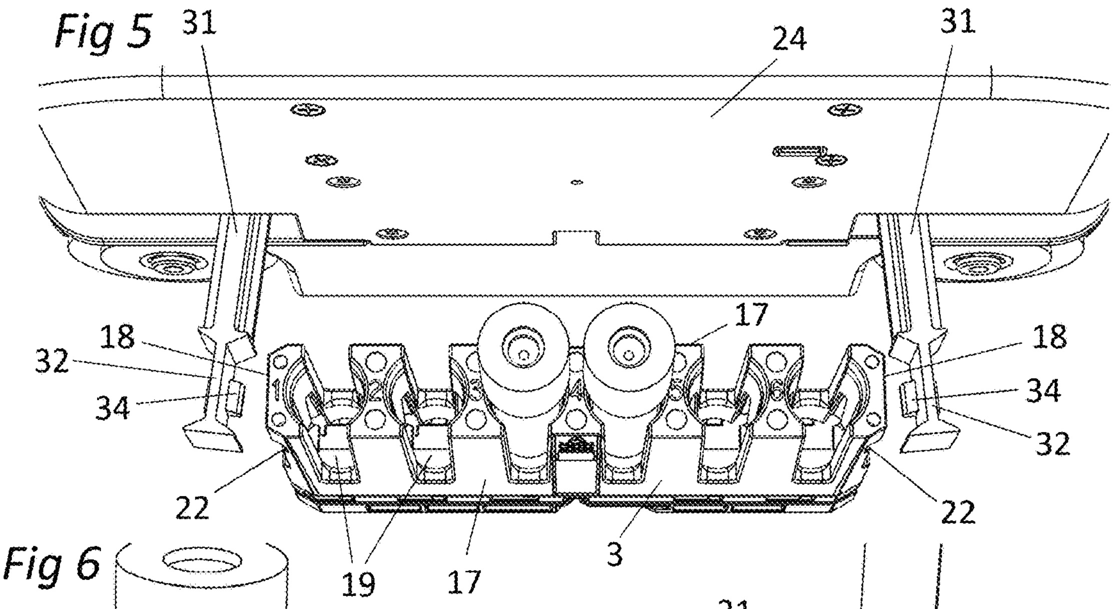
FIG. 5 is a partial perspective top view of the self-propelled conveyor carriage of FIG. 2 during gripping of a container holder.
Figure 6:
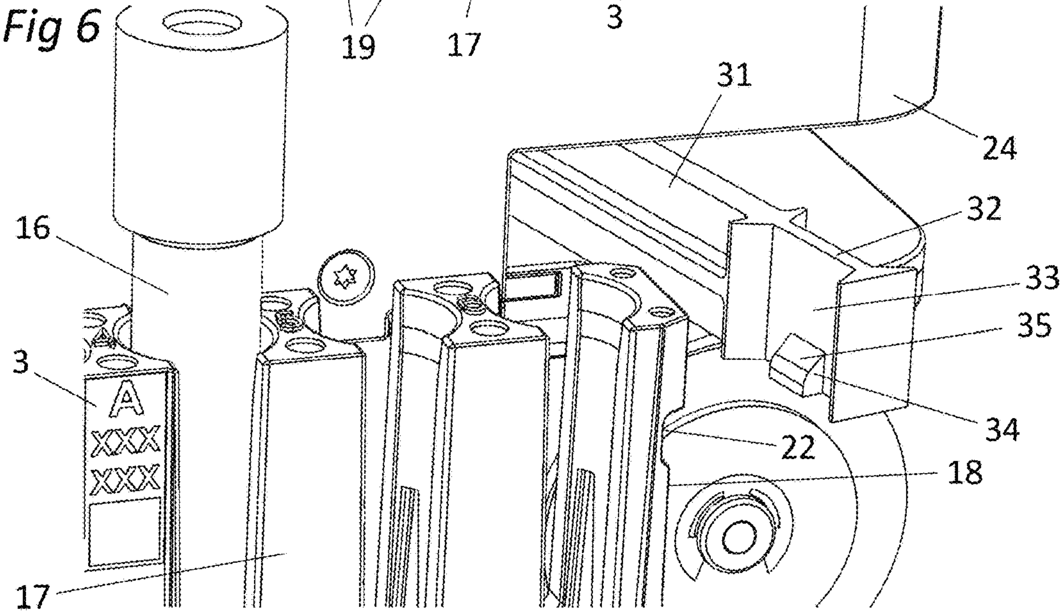
FIG. 6 is an enlarged partial perspective view of the self-propelled conveyor carriage of FIG. 2 during gripping of a container holder.

As shown more particularly in FIGS. 2 and 3, the self-propelled conveyor carriage 24 includes a carriage body 26, and drive wheels 27 rotatably mounted on the carriage body 26 and configured to roll on the support surface 23*a* of the carriage guide element 23. Each drive wheel 27 has an axis of rotation extending substantially horizontally. Advantageously, the self-propelled conveyor carriage 24 includes a pair of drive wheels which are located proximate to a first longitudinal end of the carriage body 26, and a pair of drive wheels which are located proximate to a second longitudinal end of the carriage body 26.

The self-propelled conveyor carriage 24 includes a rotational drive mechanism 28 configured to drive the drive wheels 27 in rotation. For example, the rotational drive mechanism 28 comprises a drive motor rotationally coupled to the drive wheels 27.

Each drive wheel 27 can be driven in rotation in a first direction of rotation and in a second direction of rotation opposite to the first direction of rotation. Thus, the self-propelled conveyor carriage 24 is movable along the conveyor track in a first travel direction and in a second travel direction opposite to the first travel direction.

The self-propelled conveyor carriage 24 further includes a support element 29, for example in the form of a support frame, mounted movable in translation relative to the carriage body 26 according to a horizontal travel direction and perpendicular to the conveyor track. Advantageously, the support element 29 is guided in translation by a pair of guide rods 30.

The self-propelled conveyor carriage 24 also includes two gripping arms 31 spaced apart from each other according to a longitudinal direction of the self-propelled conveyor carriage 24. The two gripping arms 31 are pivotally mounted on the support element 29 respectively about two pivot axes which are vertical. Advantageously, the two gripping arms 31 are movable in a travel plane which is substantially horizontal.

The two gripping arms 31 are pivotally mounted between at least a gripping position in which the gripping arms 31 are brought closer to each other (cf. FIGS. 11 to 16 and 18) and are configured to grip and lift a container holder 3 arranged in one of the receiving locations 8, and a release position (cf. FIGS. 3 to 5 and 17) in which the gripping arms 31 are moved away from each other and are configured to release the container holder 3 and to deposit the container holder 3 in one of the receiving locations 8. Thus, the self-propelled conveyor carriage 24 is more particularly configured to move a container holder 3, gripped and lifted by the gripping arms 31, along the travel path when the self-propelled conveyor carriage 24 moves along the conveyor track.

Each of the gripping arms 31 includes a gripping portion 32 provided with a bearing surface 33 configured to exert a bearing force against a respective transverse face 18 of a container holder 3 when the gripping arms 31 are in the gripping position. Advantageously, each gripping portion 32 is located at a free end of the respective gripping arm 31. As shown more particularly in FIG. 3, the gripping portions 32 of the two gripping arms 31 project from a lateral face 26.1 of the carriage body 26 when the two gripping arms 31 occupy the gripping position.

Each of the gripping arms 31 also includes a lifting member 34, such as a lifting projection, extending from the bearing surface 33 of a respective gripping portion 32. Advantageously, each of the lifting members 34 includes a lifting ramp 35 which is inclined with respect to the vertical.

The lifting members 34 are configured to be received respectively in the receiving recesses 22 provided on a container holder 3 when the gripping arms 31 occupy the gripping position, and to cause a rise of said container holder 3, by cooperation of the lifting ramps 35 with complementary surfaces defined by the receiving recess 22, when the gripping arms 31 are moved into the gripping position.

Figure 7:
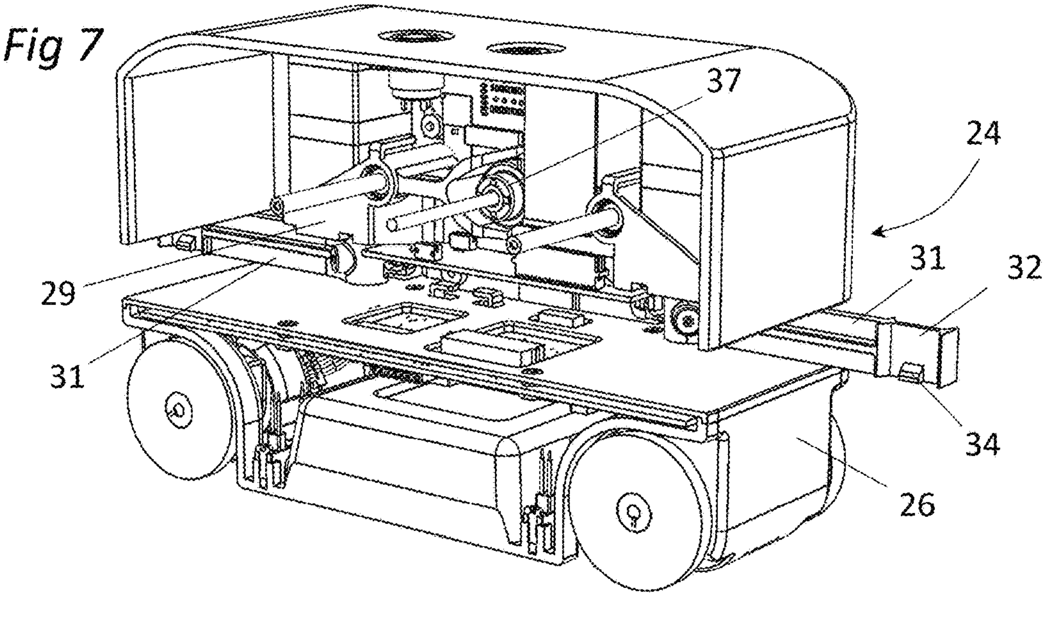
FIG. 7 is a truncated perspective view of the self-propelled conveyor carriage of FIG. 2.
Figure 8:
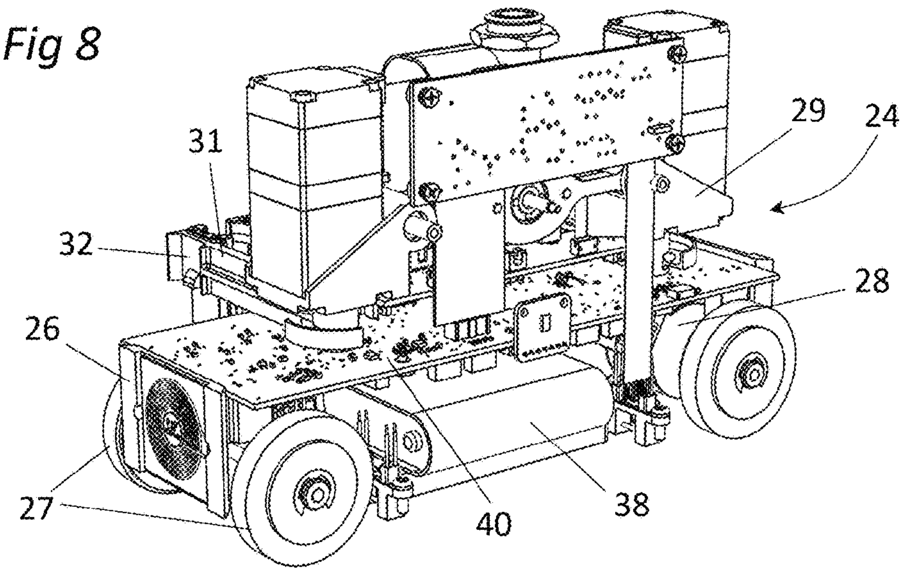
FIG. 8 is a perspective view of the self-propelled conveyor carriage of FIG. 2, wherein a body of the self-propelled conveyor carriage has been deposited.
Figure 9:
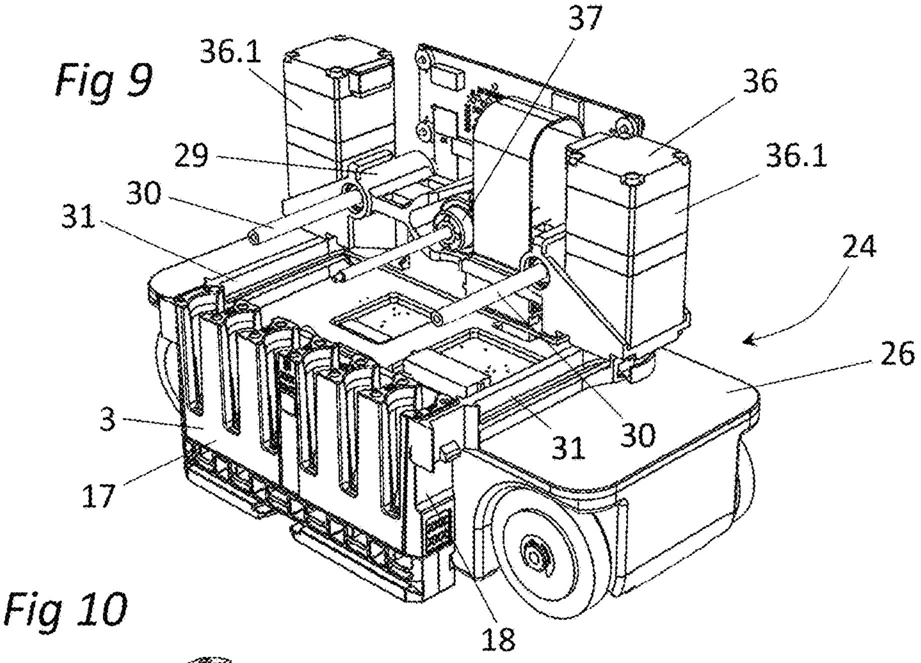
FIG. 9 is a perspective view of the self-propelled conveyor carriage of FIG. 2, wherein the upper body of the self-propelled carriage conveyor carriage has been deposited.

More particularly, the support element 29 is configured to occupy a conveying position (cf. FIGS. 7 to 9) in which, when the gripping arms 31 occupy the gripping position, each of the gripping arms 31 projects from the lateral face 26.1 of the carriage body 26 by a first distance, and a transfer position (cf. FIG. 13) in which, when the gripping arms 31 occupy the gripping position, each of the gripping arms 31 projects from the lateral face 26.1 of the carriage body 26 by a second distance which is larger than the first distance.

More particularly, the self-propelled conveyor carriage 24 is configured to move a container holder 3, gripped and lifted by the gripping arms 31, along the travel path when the support element 29 occupies the conveying position, and to grip and lift a container holder 3 arranged in a receiving location 8 or to release and deposit a container holder 3 in a receiving location 8 when the support element 29 occupies the transfer position.

Figure 12:
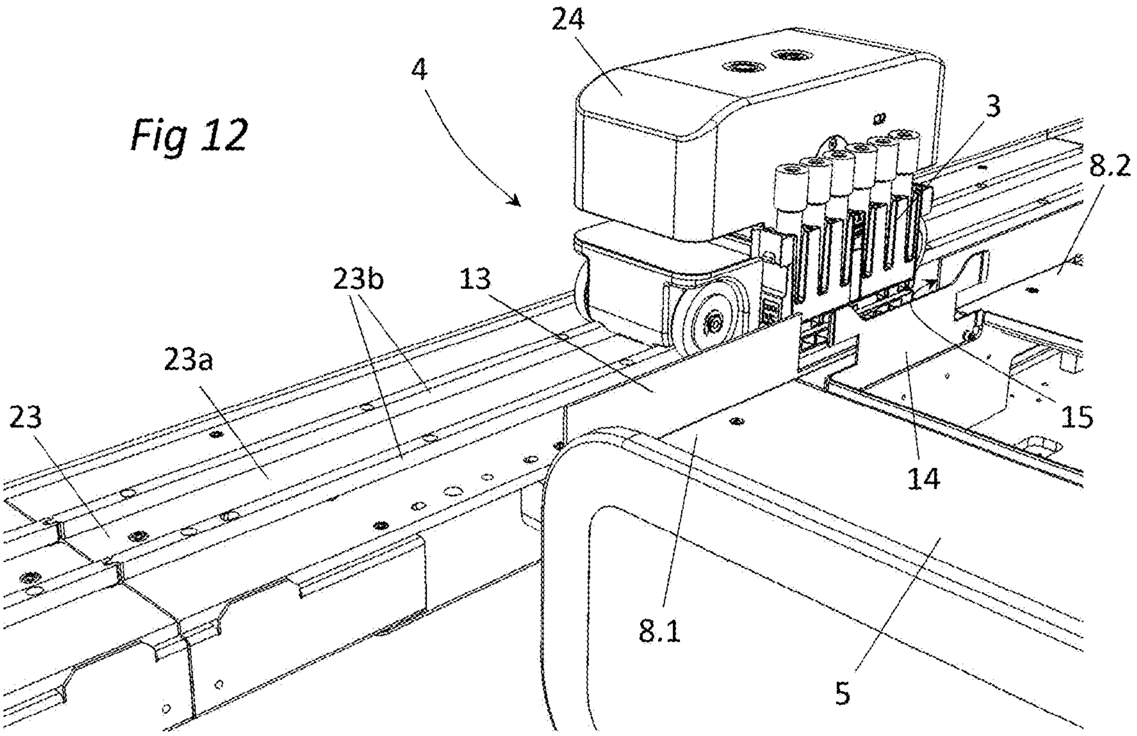
FIG. 12 is a partial perspective view of the biological analysis system of FIG. 1 showing the self-propelled conveyor carriage opposite a passage opening belonging to a receiving area associated with an analysis and/or measurement device.
Figure 13:
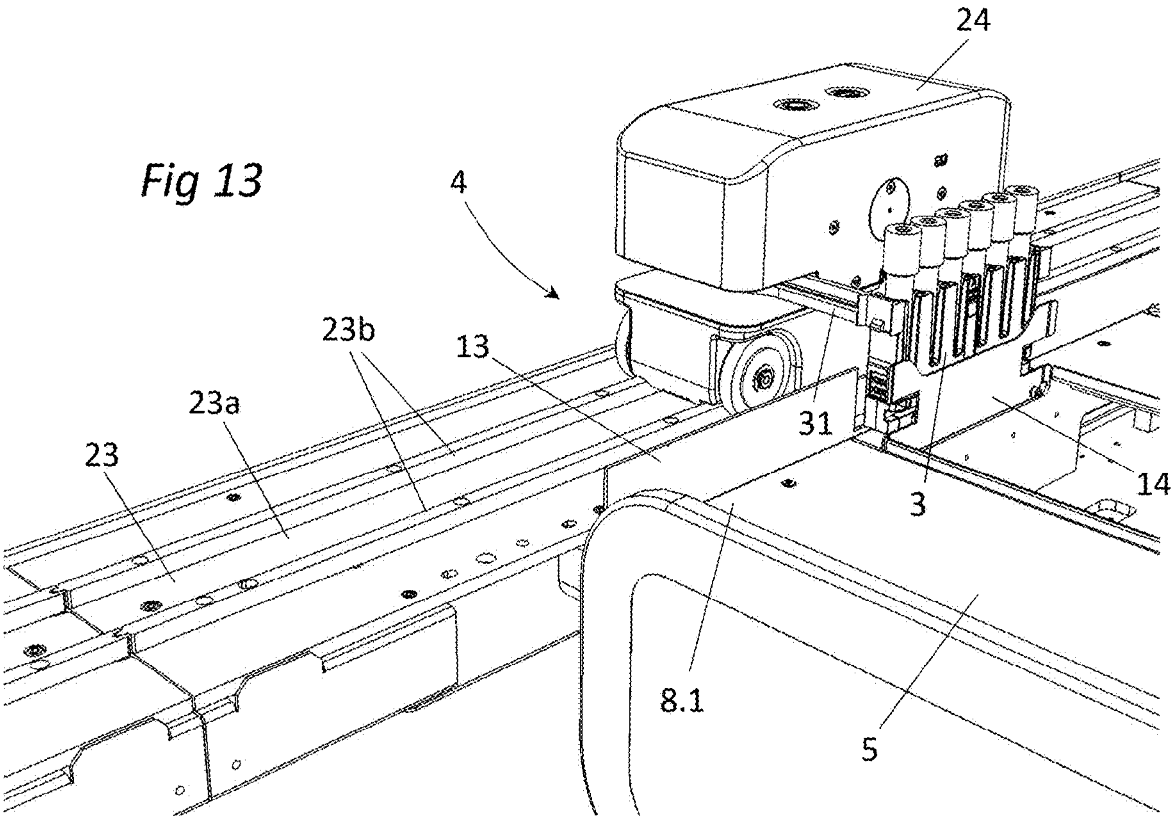
FIG. 13 is a partial perspective view of the biological analysis system of FIG. 1 showing the self-propelled conveyor carriage inserting a container holder into a guide track belonging to a receiving area associated with an analysis and/or measurement device.
Figure 14:
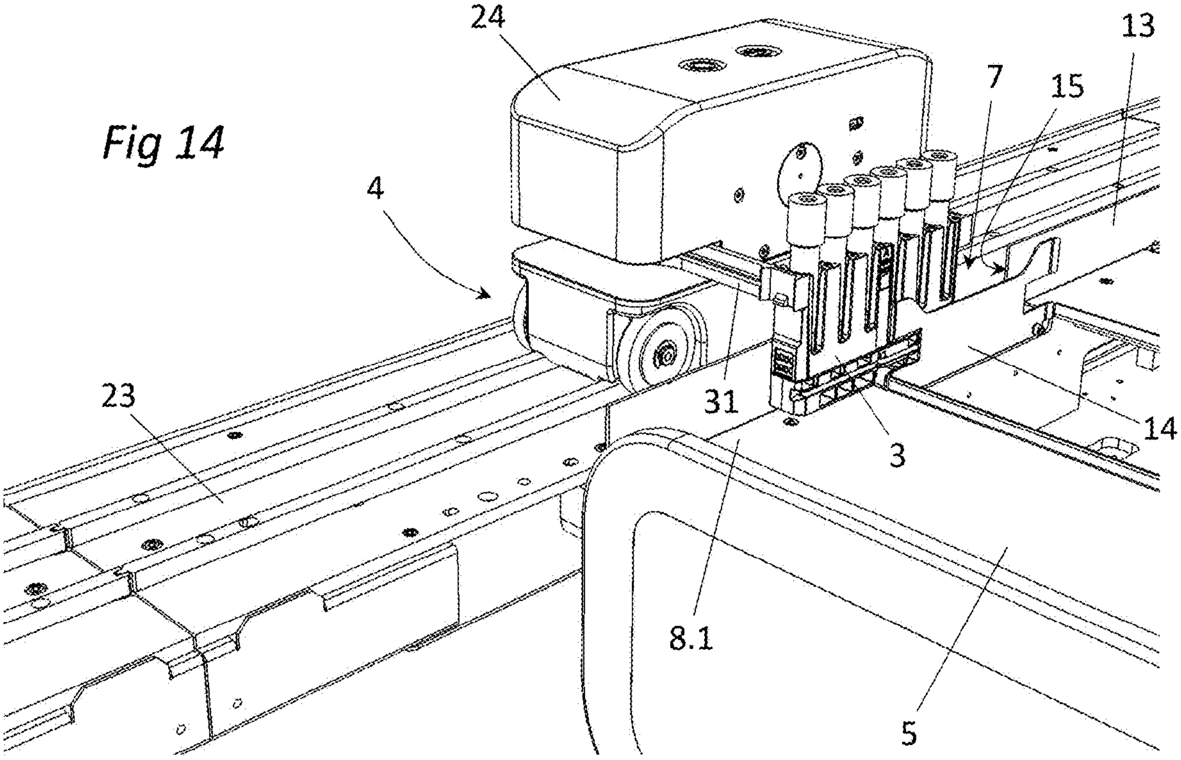
FIG. 14 is a partial perspective view of the biological analysis system of FIG. 1 showing the self-propelled conveyor carriage moving a container holder along a guide track and towards a first receiving location.
Figure 15:
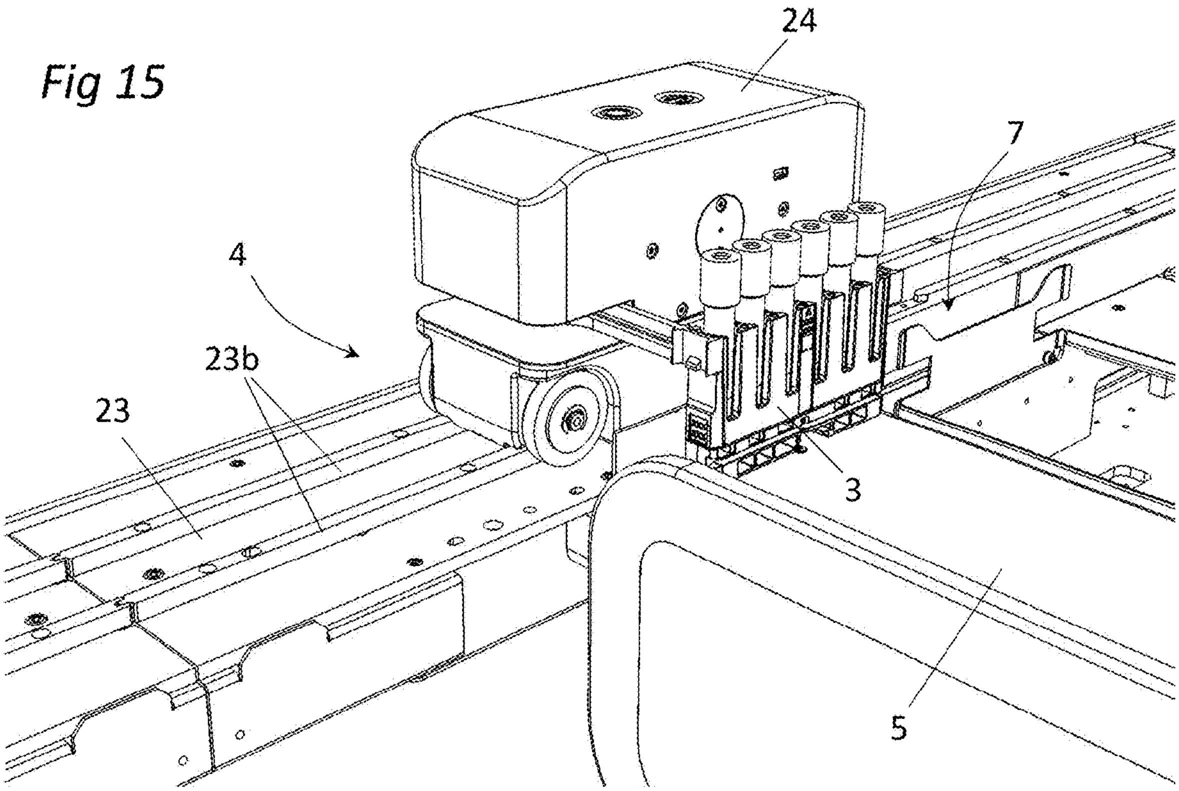
FIG. 15 is a partial perspective view of the biological analysis system of FIG. 1 showing a container holder received in a first receiving location of a receiving area.
Figure 16:
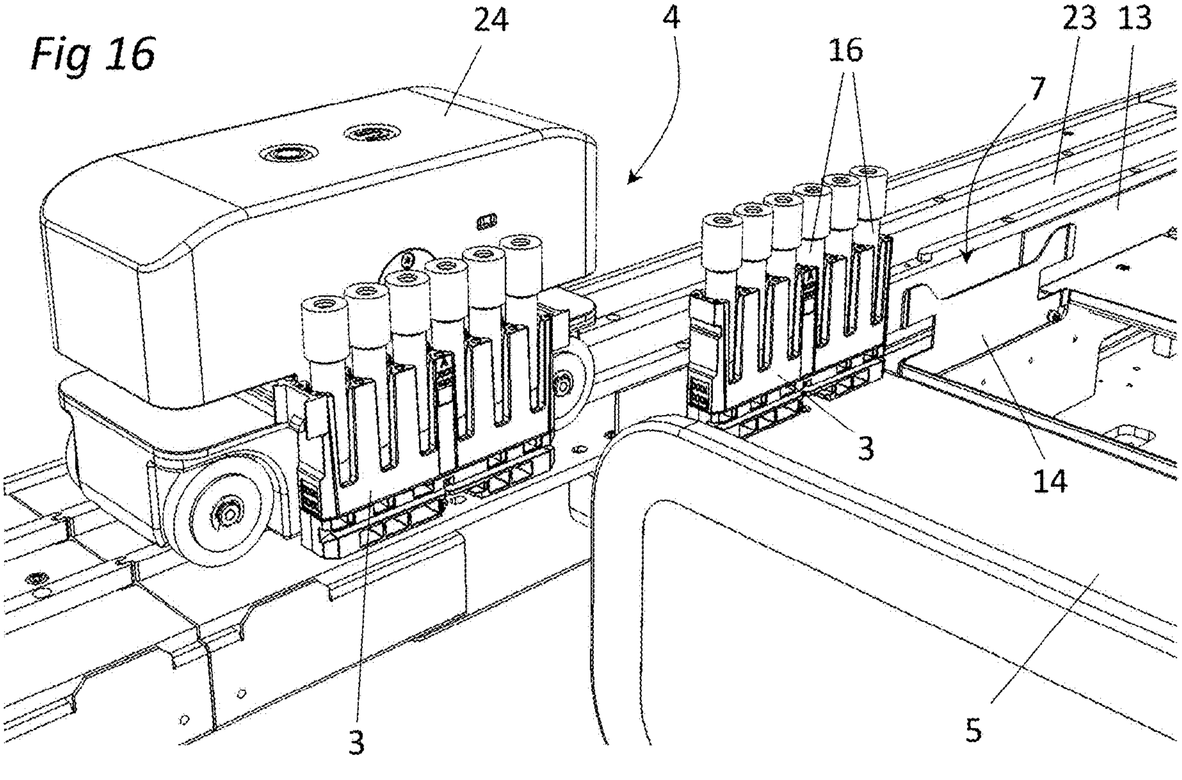
FIG. 16 is a partial perspective view of the biological analysis system of FIG. 1 showing the self-propelled conveyor carriage conveying a container holder along a travel path.
Figure 17:
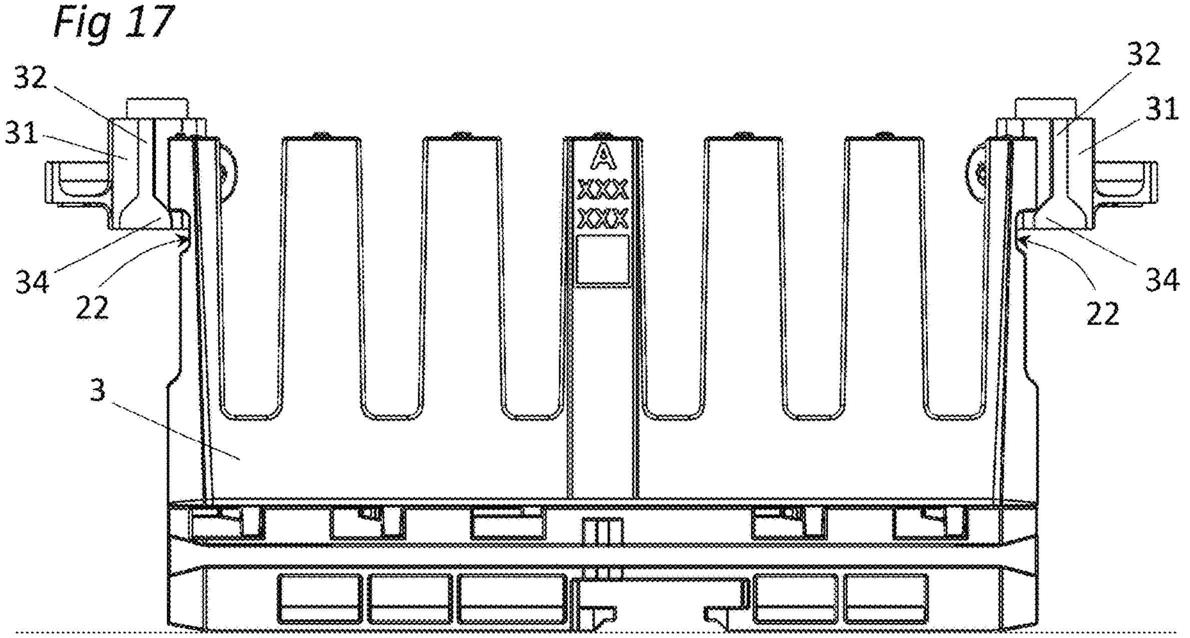
FIG. 17 is a side view of the self-propelled conveyor carriage of FIG. 2 during gripping of a container holder.
Figure 18:
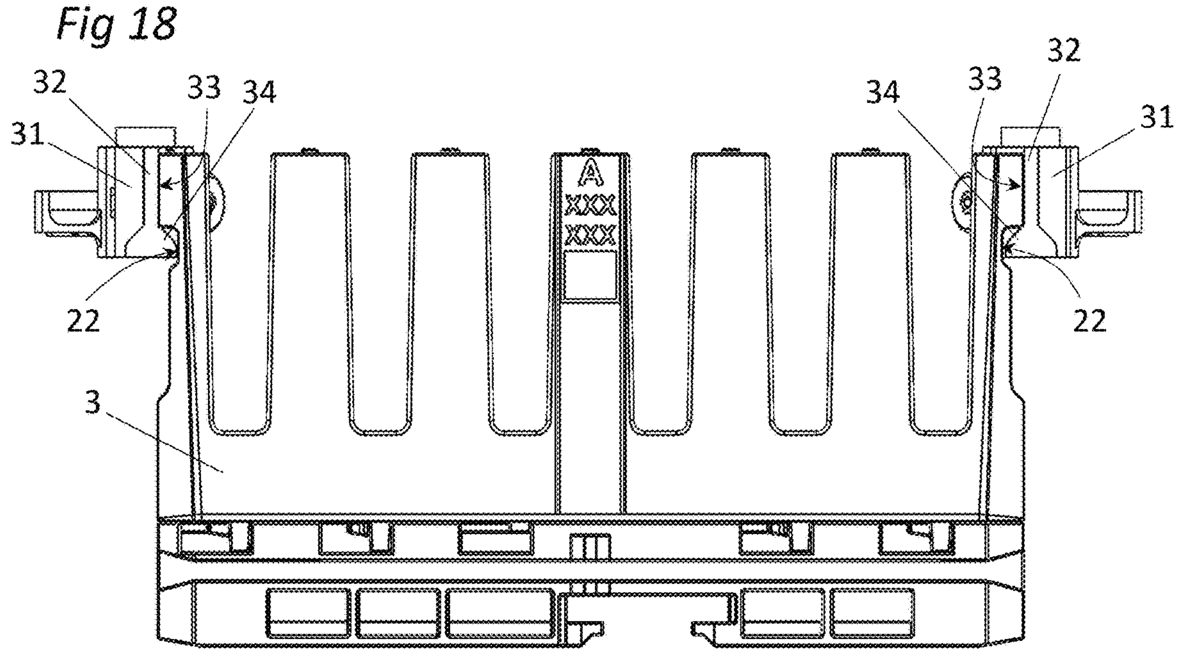
FIG. 18 is a side view of the self-propelled conveyor carriage of FIG. 2 having gripped and lifted a container holder.

As shown in FIGS. 12 and 13, the support element 29 and the gripping arms 31 of the self-propelled conveyor carriage 24 are configured such that, when the self-propelled conveyor carriage 24 is arranged opposite a passage opening 15 belonging to a receiving area 7 and that the gripping arms 31 are in the gripping position and coupled to a container holder 3, a movement of the support element 29 from the conveying position to the transfer position causes a movement of the container holder 3 out of the travel path and through the passage opening 15. In addition, the support element 29 and the gripping arms 31 are configured such that, when the self-propelled conveyor carriage 24 is arranged opposite a passage opening 15 and the gripping arms 31 are in the gripping position and coupled to a container holder 3, a displacement of the support element 29 from the transfer position to the conveying position causes a displacement of the container holder 3 out of the guide track and in the travel path.

Furthermore, the self-propelled conveyor carriage 24 is configured to move a container holder 3, gripped and lifted by the gripping arms 31 and arranged in the guide track, along the guide track when the self-propelled conveyor carriage 24 moves along the conveyor track.

The self-propelled conveyor carriage 24 further includes an actuating device 36 configured to make each of the gripping arms 31 pivot about its pivot axis, and therefore to move the two gripping arms 31 between the gripping and release positions. The actuating device 36 may include different types of actuators known to a person skilled in the art, and for example two motors 36.1 each of which rotatably coupled to a respective gripping arm 31.

The self-propelled conveyor carriage 24 also includes a translational drive mechanism 37 configured to move the support element 29 in translation relative to the carriage body 26 and between the conveying position and the transfer position. The translational drive mechanism 37 may include different types of actuators known to a person skilled in the art, and may for example include a linear motor, such as a worm gear motor, comprising a first portion connected to the support element 29 and a second portion connected to the carriage body 26. According to one variant, the translational drive mechanism could include a rack provided on the support element 29, a gear wheel provided on the carriage body 26 and configured to cooperate with the rack, and a drive motor provided on the carriage body 26 and rotatably engaged with the gear wheel.

The self-propelled conveyor carriage 24 also includes a battery 38 configured to electrically power the self-propelled conveyor carriage 24, and more particularly the translational drive mechanism 37, the rotational drive mechanism 28 and the actuating device 36. The battery 38 is also configured to electrically power an electronic control unit 40 which equips the self-propelled conveyor carriage 24 and which is configured to control the operation of the self-propelled conveyor carriage 24. More particularly, such an electronic control unit 40 includes an electronic board provided with a microprocessor.

According to the embodiment shown in the figures, the battery 38 is rechargeable, and may be recharged for example by contact or by induction. To this end, the conveyor system 2 includes at least one recharging area 39 including an electrical recharging device configured to electrically recharge the battery 38 when the self-propelled conveyor carriage 24 is located in the recharging area. Advantageously, the conveyor system 2 includes two recharging areas 39 each located at one end of the conveyor track, and a charging coil is provided proximate to each of the longitudinal ends of the self-propelled conveyor carriage 24.

According to an embodiment of the present disclosure, the conveyor system 2 includes a plurality of positioning markings (not visible in the figures) arranged on the conveyor track. For example, the conveyor system 2 includes a positioning marking opposite each receiving location 8 and each passage opening 15.

According to such an embodiment of the present disclosure, the self-propelled conveyor carriage 24 includes, on the one hand, detection means, such as an optical reader, an RFID detector or an inductive detector, configured to detect the positioning markings arranged on the conveyor track during the movements of the self-propelled conveyor carriage 24 along the conveyor track, and on the other hand, control means, such as an integrated circuit or a microprocessor, configured to control the immobilization of the self-propelled conveyor carriage 24 when the detection means detect the positioning marking associated with the receiving location 8 or with the passage opening 15 that the self-propelled conveyor carriage 24 should reach. For example, each positioning marking may be formed by an optical barrier, a barcode, a QR code, an RFID tag or a cutout in one of the guide rails 23*b*.

According to an embodiment of the present disclosure, the self-propelled conveyor carriage 24 further includes determination means configured to determine the position of the self-propelled conveyor carriage 24 along the conveyor track according to the distance travelled by the self-propelled conveyor carriage 24. To this end, the drive wheels 27 could be configured to drive an encoder allowing measuring the distance travelled by the self-propelled conveyor carriage 24 and to servo-control the controlled movement to the self-propelled conveyor carriage 24 by the electronic control unit 40, in particular, according to this travelled distance.

As shown in FIG. 1, the conveyor system 2 includes a control unit 41 configured to communicate remotely, for example by wifi or Bluetooth, with the self-propelled conveyor carriage 24. The control unit 41 may be a computer, for example a PC type computer. Advantageously, the control unit 41 is also configured to communicate with the various analysis and/or measurement devices 5.

Advantageously, the control means belonging to the self-propelled conveyor carriage 24 are configured to receive control signals originating from the control unit 41, and to transmit drive signals in particular to the translational drive mechanism 37, to the rotational drive mechanism 28 and to the actuation device 36, in response to the received control signals.

The conveyor system 2 further comprises an additional storage device 42, also called unloading device, arranged along the conveyor unit 4 and configured to store container holders 3 unloaded from the conveyor unit 4.

An example of a method for treating samples that can be carried out using the previously-described biological analysis system 1 will now be described. In particular, such a sample treatment method comprises the following steps consisting in:

a) manually loading containers 16 in container holders 3 and manually loading the container holders 3 in the storage device 6;

b) optically reading, using an identification code reading device provided in the storage device 6, identification codes carried by the different containers 3 supported by the container holders 4 loaded in the storage device 6;

c) optionally, driving one or more of the containers 16 carried by the container holders 4 in rotation so as to ensure optical reading of their identification codes by the identification code reading device;

d) automatically loading a container holder 3 in the second receiving location 8.2 of the receiving area 7 located proximate to the storage device 6;

e) determining the destinations of the container holder 3 loaded in the second receiving location 8.2 of the receiving area 7 located proximate to the storage device 6 according to the identification codes carried by the different containers 16 held by said container holder 3 and according to the prescribed analyses and communicated by the control unit 41 or a central computer of the laboratory;

f) controlling a movement of the self-propelled conveyor carriage 24 opposite the second receiving location 8.2 of the receiving area 7 located proximate to the storage device 6;

g) controlling a movement of the support element 29 of the self-propelled conveyor carriage 24 in the transfer position and a pivoting of the gripping arms 31 of the self-propelled conveyor carriage 24 in the gripping position so as to grip and lift the container holder 3;

h) controlling a displacement of the support element 29 in the conveying position;

i) controlling a displacement of the self-propelled conveyor carriage 24 opposite the passage opening 15 provided on the receiving area 7 associated with the analysis and/or measurement device 5 in which said container holder 3 should be loaded;

j) controlling a translation of the support element 29 of the self-propelled conveyor carriage 24 in the transfer position so as to move the container holder 3 through the passage opening 15 and in the guide track defined by the receiving area 7;

k) controlling a displacement of the self-propelled conveyor carriage 24 along the conveyor track so as to position the container holder 3 in the first receiving location 8.1 provided in said receiving area 7;

l) controlling a pivoting of the gripping arms 31 of the self-propelled conveyor carriage 24 in the release position so as to release the container holder 3;

m) loading the container holder 3 in the analysis and/or measurement device 5 associated with the receiving area 7, drawing a sample in one or more container(s) 16 held by said container holder 3, using a sampling device belonging to the analysis and/or measurement device 5, and treating the drawn sample(s) using the analysis and/or measurement device 5; during these sampling and treatment steps, the self-propelled conveyor carriage 24 may be controlled to move one or more other container holder(s) 3 in hidden time;

n) moving the container holder 3, previously loaded in the aforementioned analysis and/or measurement device 5, in the second receiving location 8.2 of the receiving area 7 associated with this analysis and/or measurement device 5, and controlling a displacement of the self-propelled conveyor carriage 24 opposite said second receiving location 8.2;

o) controlling a translation of the support element 29 of the self-propelled conveyor carriage 24 in the transfer position, and controlling a pivoting of the gripping arms 31 in the gripping position so as to grip and lift the container holder 3 arranged in the second receiving location 8.2;

p) controlling a translation of the support element 29 of the self-propelled conveyor carriage 24 in the conveying position so as to evacuate the container holder 3 out of the guide track;

q) controlling a displacement of the self-propelled conveyor carriage 24 opposite a receiving location 8 located proximate to the additional storage device 42, and controlling a translation of the support element 29 of the self-propelled conveyor carriage 24 in the transfer position so as to unload the container holder 3 in the aforementioned receiving location 8; and r) controlling a pivoting of the gripping arms 31 of the self-propelled conveyor carriage 24 in the release position so as to release the container holder 3.

The biological analysis system 1 according to the present disclosure is intended to fluidize the treatment flows of the samples in an analysis laboratory, in order to increase productivity and quality thereof (reduction of labor and errors). Thus, it goes without saying that the conveyor system 2 according to the present disclosure is configured to communicate with the control unit 41, which manages the workloads of the different analysis and/or measurement devices 5 (such as the tests to be performed per sample), and transmits them to the conveyor system 2 and to the analysis and/or measurement devices 5 such that the different containers 16 are conveyed towards the analysis and/or measurement devices 5 according to the test requests and the capacities of each analysis and/or measurement device 5. Hence, the control unit 41, which manages the conveyor and loading carriages, features an "intelligence", some kind of ERP (integrated management software) for optimizing the conveying of the container holders 3 according to the workloads of the different analysis and/or measurement devices 5.

In addition, each analysis and/or measurement device 5 may comprise a communication and display interface, and embedded electronics (not shown in the figures). For example, each communication and display interface includes a touchscreen 66 connected to a PC type computer. The PC type computer is more particularly configured to record analysis requests loaded manually by an operator using the touchscreen or originating from the control unit 41 or from a central computer of the laboratory, to send analysis requests to the embedded electronics, to retrieve measured data, process them thanks to specific algorithms, and make the results available to the operator or transmit them to the control unit 41.

According to a variant of the present disclosure, the biological analysis system 1 could include analysis and/or measurement devices 5 arranged on either side of the conveyor unit 4, and the two gripping arms 31 of the self-propelled conveyor carriage 24 could be configured to occupy a first gripping position in which the two gripping arms 31 project from a first lateral face 26.1 of the carriage body 26 and are configured to grip and lift a container holder 3 arranged on a first side of the conveyor track, and a second gripping position in which the two gripping arms 31 project from a second lateral face 26.2 of the carriage body 26 and are configured to grip and lift a container holder 3 arranged on a second side of the conveyor track.

Thus, the biological analysis system 1 according to the present disclosure comprises pre-analytical, analytical and post-analytical portions. For example, the pre-analytical portions include in particular a container holder loading station, an identification code identification station, and a conveyor unit for conveying container holders in particular towards one or more analysis and/or measurement machine(s). The pre-analytical portions may also include one or more station(s) among a centrifugation station, an aliquoting station and a tube unplugging station.

For example, the analytical portions may include one or more station(s) among a biochemistry (for example photometry) station, an immunochemistry (for example immunofluorescence) station, a coagulation station, a hematology station and a cytometry station.

For example, the post-analytical portions may include a short-term storage station and/or a long-term refrigerated storage station.

As it goes without saying, the present disclosure is not limited to the sole embodiment of this biological sample treatment system, described hereinabove as example, it encompasses on the contrary all variants thereof.

The invention claimed is:

1. A biological sample treatment system comprising:

a conveyor system; and an analysis device or a measurement device; wherein the conveyor system comprises a plurality of container holders, a conveyor unit and a plurality of receiving locations;

each container holder of the plurality of container holders is configured to hold a container containing a biological sample;

each container holder of the plurality of container holders comprises a first face and a second face opposite the first face;

the conveyor unit is configured to convey the plurality of container holders;

the conveyor unit includes a carriage guide element and a self-propelled conveyor carriage;

the carriage guide element defines a conveyor track;

the self-propelled conveyor carriage is movable along the conveyor track;

the carriage guide element is configured to guide the self-propelled conveyor carriage during displacements of the self-propelled conveyor carriage along the conveyor track;

the self-propelled conveyor carriage includes a carriage body;

the self-propelled conveyor carriage is configured to move a container holder of the plurality of container holders along a travel path when the self-propelled conveyor carriage moves along the conveyor track;

the plurality of receiving locations is arranged along the travel path and laterally offset with respect to the travel path;

each receiving location of the plurality of receiving locations is configured to receive and hold a container holder of the plurality of container holders;

the self-propelled conveyor carriage is further configured to move a container holder of the plurality of container holders transversely to the travel path so as to move the container holder into or out of a receiving location;

the analysis device or the measurement device or both are arranged along the conveyor unit and configured to carry out blood tests;

the self-propelled conveyor carriage includes a first gripping arm and a second gripping arm spaced apart from the first gripping arm;

the first gripping arm and the second gripping arm are mounted movable between a gripping position and a release position such that in the gripping position the first gripping arm and the second gripping arm are brought closer and grip and lift a container holder of the plurality of container holders arranged in a first receiving location of the plurality of receiving locations, and such that in the release position the first gripping arm and the second gripping arm are moved away from each other, release the container holder and deposit the container holder in a second receiving location of the plurality of receiving locations;

the self-propelled conveyor carriage is configured to move a container holder of the plurality of container holders, with the first gripping arm and the second gripping arm gripping and lifting the container holder, along the travel path when the self-propelled conveyor carriage moves along the conveyor track;

the first gripping arm includes a first lifting member;

the second gripping arm includes a second lifting member;

the first lifting member is configured to fit in a first receiving recess of a first face of a container holder of the plurality of container holders;

the second lifting member is configured to fit in a second receiving recess of a second face of the container holder; and the first lifting member and the second lifting member are configured to lift the container holder when the first gripping arm and the second gripping arm are moved towards the gripping position.

2. The biological sample treatment system according to claim 1, wherein the carriage body has a lateral face and the first gripping arm and the second gripping arm project from the lateral face when the first gripping arm and the second gripping arm are in the gripping position.

3. The biological sample treatment system of claim 1, wherein the first gripping arm is mounted about a first substantially vertical pivot axis and the second gripping arm is mounted about a second substantially vertical pivot axis.

4. The biological sample treatment system according to claim 1, wherein the first gripping arm and the second gripping arm are movable in a substantially horizontal travel plane.

5. The biological sample treatment system according to claim 1, wherein the first lifting member includes a first lifting ramp inclined with respect to a vertical axis;

the second lifting member includes a second lifting ramp inclined with respect to the vertical axis; and the first lifting member and the second lifting member are configured to lift a container holder of the plurality of container holders when the the first gripping arm and the second gripping arm are displaced towards the gripping position.

6. The biological sample treatment system according to claim 1, wherein the conveyor system comprises a receiving area along the travel path, the receiving area including a first receiving location and a second receiving location offset from the first receiving location along the travel path;

the first receiving location is configured to receive and hold a container holder of the plurality of container holders; and the second receiving location is configured to receive and hold a container holder of the plurality of container holders.

7. The biological sample treatment system according to claim 6, wherein the receiving area includes a first guide wall and a second guide wall offset from the first guide according to a direction extending transversely to the travel path;

the first guide wall and the second guide wall define a guide track extending along the travel path;

the guide track includes a first guide track end and a second guide track end opposite the first guide track end;

the first receiving location is arranged at the first guide track end;

the second receiving location is arranged at the second guide track end;

the first guide wall separates the travel path and the guide track, and includes a passage opening opposite the second guide wall;

the passage opening is configured to enable a container holder of the plurality of container holders to pass;

the self-propelled conveyor carriage is configured to move a container holder of the plurality of container holders, with the first gripping arm and the second gripping arm gripping and lifting the container holder, through the passage opening and along the guide track.

8. The biological sample treatment system according to claim 1, wherein the self-propelled conveyor carriage includes a support element on which the first gripping arm and the second gripping arm are movably mounted;

the support element is mounted movable in translation relative to the carriage body according to a travel direction transverse to the conveyor track and between a conveying position and a transfer position such that in the conveying position the self-propelled conveyor carriage moves a container holder of the plurality of container holders, with the first gripping arm and the second gripping arm gripping and lifting the container holder, along the travel path and such that in the transfer position the self-propelled conveyor carriage grips and lifts a container holder of the plurality of container holders arranged in a receiving location or releases and deposits a container holder of the plurality of container holders in a receiving location.

9. The biological sample treatment system according to claim 8, wherein the carriage body includes a carriage body lateral face;

the first gripping arm and the second gripping arm project from the carriage body lateral face when first gripping arm and the second gripping arm are in the gripping position; and the first gripping arm and the second gripping arm project from the carriage body lateral face by a first distance when the support element is in the conveying position and the first gripping arm and the second gripping arm are in the gripping position;

the first gripping arm and the second gripping arm projects from the lateral face of the carriage body by a second distance larger than the first distance when the support element is in the transfer position and the first gripping arm and the second gripping arm are in the gripping position.

10. The biological sample treatment system according to claim 1, wherein the self-propelled conveyor carriage comprises a drive wheel and a rotation drive mechanism;

the drive mechanism is configured to roll on the carriage guide element; and the rotational drive mechanism is configured to drive the drive wheel in rotation.

11. The biological sample treatment system of claim 2, wherein the first gripping arm is pivotally mounted about a first substantially vertical pivot; and the second gripping arm is pivotally mounted about a second substantially vertical pivot axis.

12. The biological sample treatment system according to claim 11, wherein the first gripping arm and the second gripping arm are movable in a substantially horizontal travel plane.

* * * * *